United States Patent
Laughman et al.

(10) Patent No.: US 8,793,003 B2
(45) Date of Patent: Jul. 29, 2014

(54) CONTROLLING OPERATIONS OF VAPOR COMPRESSION SYSTEM

(75) Inventors: Christopher Laughman, Waltham, MA (US); Daniel Nikolaev Nikovski, Brookline, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 365 days.

(21) Appl. No.: 13/076,584

(22) Filed: Mar. 31, 2011

(65) Prior Publication Data

US 2012/0253543 A1   Oct. 4, 2012

(51) Int. Cl.
| | |
|---|---|
| G05B 13/02 | (2006.01) |
| G05D 7/00 | (2006.01) |
| G05D 23/00 | (2006.01) |
| F25B 1/00 | (2006.01) |
| F25B 49/00 | (2006.01) |

(52) U.S. Cl.
USPC ............ 700/28; 700/282; 700/300; 62/228.3; 62/226; 62/215

(58) Field of Classification Search
CPC ............. F25B 49/02; F25B 2600/2515; F25B 41/062; G06Q 60/06; H05K 7/20836
USPC ........... 700/28, 285, 282, 300; 62/228.3, 113, 62/89, 498, 216, 195, 115
See application file for complete search history.

(56) References Cited

U.S. PATENT DOCUMENTS

| | | | |
|---|---|---|---|
| 4,856,286 A | 8/1989 | Sulfstede | |
| 5,255,529 A | 10/1993 | Powell | |
| 5,735,134 A * | 4/1998 | Liu et al. | 62/230 |
| 7,246,500 B2 * | 7/2007 | Singh et al. | 62/181 |
| 2008/0105530 A1 | 5/2008 | Bednarek et al. | 202/205 |
| 2010/0324742 A1 * | 12/2010 | Huerta-Ochoa | 700/282 |
| 2012/0041608 A1 * | 2/2012 | Zugibe et al. | 700/285 |
| 2012/0065795 A1 * | 3/2012 | Blackshaw et al. | 700/295 |
| 2012/0198867 A1 * | 8/2012 | Ng et al. | 62/93 |

FOREIGN PATENT DOCUMENTS

| | | |
|---|---|---|
| GB | 2450228 A | 12/2008 |
| WO | 2004/053404 A2 | 6/2004 |

OTHER PUBLICATIONS

Leducq et al., "Non-Linear predictive control of a vapour compression cycle, International Journal of Refrigeration 29 (2006) 761-772."*

* cited by examiner

*Primary Examiner* — Darrin Dunn
(74) *Attorney, Agent, or Firm* — Dirk Brinkman; Gene Vinokur

(57) ABSTRACT

A method and a system control an operation of a vapor compression system using a set of control inputs. A control value is determined based on an output of the operation of the vapor compression system and a setpoint for the operation of the vapor compression system. The control value is used to select at least a subset of the set of control inputs from a computer-readable medium, wherein the subset of control inputs, along or in combination with a function of the control value, forms the set of control inputs.

5 Claims, 12 Drawing Sheets

300

400

500

600

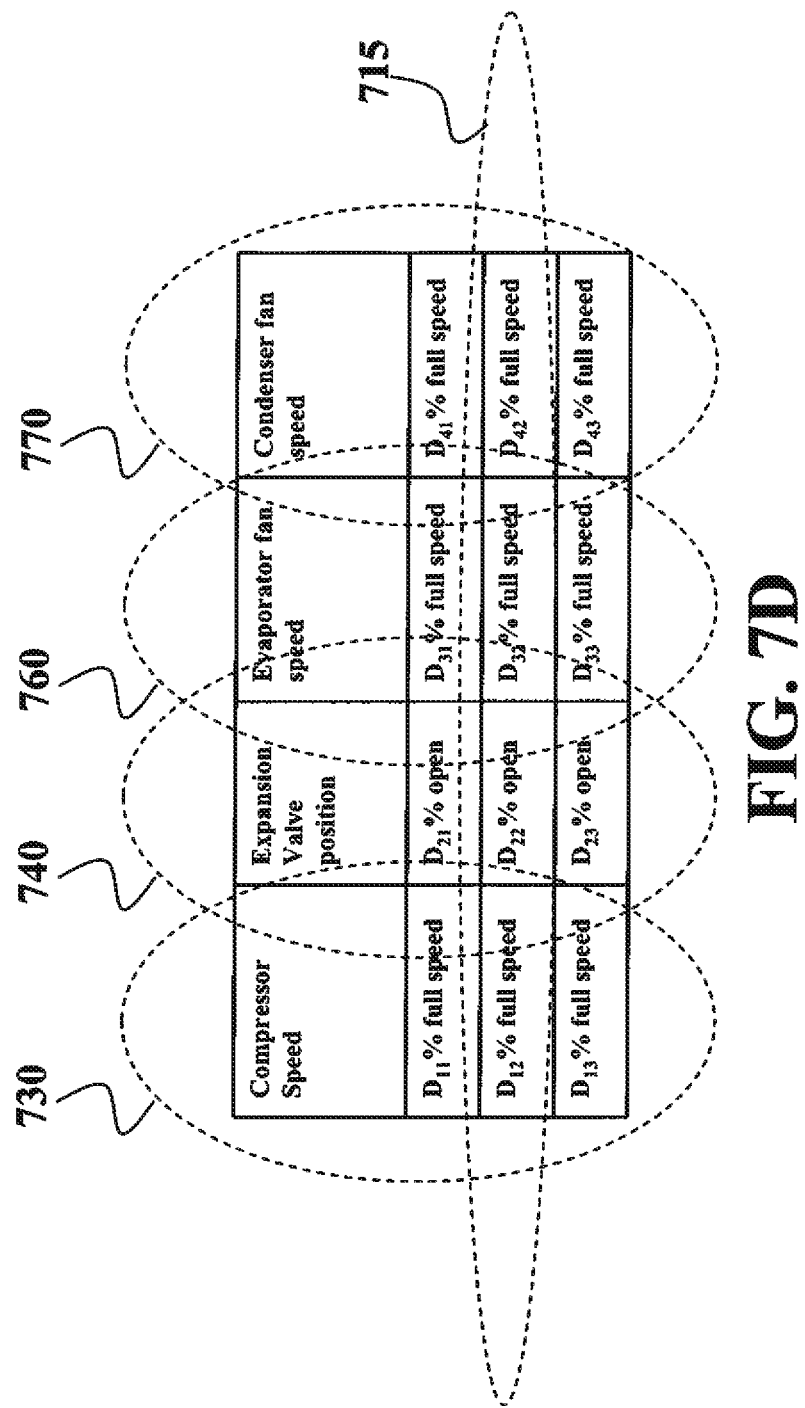

CONTROLLING OPERATIONS OF VAPOR COMPRESSION SYSTEM

FIELD OF THE INVENTION

This invention relates generally to vapor compression systems, and more particularly to controlling operations of the vapor compression system.

BACKGROUND OF THE INVENTION

Vapor compression systems, such as heat pumps, refrigeration and air-conditioning systems, are widely used in industrial and residential applications. The introduction of variable speed compressors and variable position valves to the vapor compression cycle has greatly improved the flexibility of the operation of such systems. It is possible to use these new components to improve the efficiency of vapor compression systems by controlling the components correctly.

For example, a speed of the compressor can be adjusted to modulate a flow rate of a refrigerant. The speed of an evaporator fan and a condenser fan can be varied to alter heat transfer coefficients between air and heat exchangers. The change in an expansion valve opening can directly influence a pressure drop between the high-pressure side and the low-pressure side of the vapor compression system, which, in turn, affects the flow rate of the refrigerant as well as superheat at the corresponding evaporator outlet. The possibilities to control operations of components vapor compression systems offer opportunities for improving both energy efficiency and reliability of the systems.

The operation cycle of the vapor compression system starts from compressing the refrigerant by the compressor into a high-temperature, high-pressure vapor state, after which the refrigerant flows into the condenser. Since the air flowing over the condenser coils is cooler than the refrigerant, the refrigerant cools down to form a high-pressure, low-temperature liquid upon exiting the condenser. The refrigerant then passes through a throttling valve that creates a large pressure drop, so that the pressure of the refrigerant after leaving the valve decreases. The low-pressure refrigerant boils at a much lower temperature, so the air passing over the evaporator coils heats up the refrigerant. Thus, the air is cooled down, and the low-pressure liquid refrigerant is converted to a low-pressure vapor. This low-pressure, low-temperature vapor then enters the compressor, and the operation cycle of the vapor compression system is repeated.

The operation of the typical vapor compression system is affected by a set of environmental parameters, such as thermal load on the system as well as air temperatures at an evaporator and a condenser. Some of these environmental parameters, such as the indoor temperature, have a desired value, i.e., a setpoint, for users of the vapor compression system. For example, the setpoint can be one variable, e.g., the indoor temperature. Also, the setpoint can be a set of multiple variables, such as the temperature and relative humidity of the indoor air.

The operation of the vapor compression system is also defined by a set of thermodynamic parameters of the refrigerant, such as evaporating pressure $P_e$, the amount of superheat at the evaporator outlet (SH), condensing pressure $P_c$, and the amount of subcooling at the condenser outlet (SC). The setpoint can be provided for both the environmental and the thermodynamic parameters.

Typically, the operation of the vapor compression system is regulated by a control system. The control system converts the setpoint and the thermodynamic parameters to a set of control inputs, which control the various components of the vapor compression system to reach and maintain the thermodynamic parameters and the setpoint at a specified level. The set of control inputs can include a speed of a compressor, a position of an expansion valve, and the speed of fans in both the evaporator and the condenser.

Accordingly, it is desired to determine the set of control inputs that optimizes a performance of the vapor compression system. A number of methods for controlling operations of the vapor compression system are disclosed in the art. However, there is a need in the art for improving those methods.

For example, one method [disclosed in U.S. Pat. No. 7,246,500] determines optimal energy consumption by comparison of operation of the vapor compression system controlled by modulating the condenser fan speed. However, large changes in the cooling load might result in suboptimal energy consumption because the system does not apply sufficient adjustments to the condenser fan speed to find the optimal value of this fan speed.

Another method for controlling a vapor compression system [disclosed in U.S. Pat. No. 5,735,134] considers the possibility of sudden change in environmental or thermal load requirements, monitors the vapor compression system in real-time, and determines, based on these actual real-time measurements, a set of parameters to enable the system to operate at maximum coefficient of performance.

Hence, this method determines the set of control inputs every time upon the change in environmental or thermal load requirements. However, such determination is time consuming, and requires substantial real time computational resources. However, some applications require the minimization of computational complexity while determining the optimal set of control inputs in real time during the operation of the vapor compression system.

Another method [disclosed in U.S. Pat. No. 7,076,962] first determines amount of heat flow across an evaporator or a condenser. Next, the amount of heat flow is used to determine the set of optimal control inputs. As the amount of heat flow is directly related to the operation of the vapor compression system, its determination is difficult to avoid. However, there are applications in which it is desired to determine the optimal set of control inputs without determining the amount of heat that the vapor compression system needs to transfer in accordance with a desired setpoint.

Yet another method [disclosed in JP 2000-257941] reduces energy consumption of cold water or hot-water in the air conditioner by measuring the room temperature with a thermometer and retrieving a value of a valve opening from a valve opening table using the room temperature as an index. However, conventional vapor compression systems typically have number of different components, including but not limited to the valve, which need to be controlled concurrently. Moreover, this method determines the valve opening based on outside environment conditions only, which is not always optimal.

SUMMARY OF THE INVENTION

It is an object of an invention to provide a method for determining a set of control inputs that optimizes an operation of a vapor compression system.

It is further an object of the invention to provide such a method that optimizes energy efficiency of the vapor compression system operating to reach and maintain a specified setpoint.

It is further an object of the invention to provide such a method that determines an optimal set of control inputs in real time.

It is further an object of the invention to provide such a method that determines the optimal set of control inputs while minimizing computation complexity during the operation of the vapor compression system.

It is further an object of the invention to provide a method that determines the optimal set of control inputs without determining the amount of heat that the vapor compression system needs to transfer in accordance with a desired setpoint.

Embodiments of the invention are based on a realization that different combinations of control inputs can be used to operate the vapor compression system such that a specified setpoint, e.g., indoor temperature, is reached and maintained as a result of an operation of the vapor compression system. However, these different combinations of control inputs can result in different performance according to an additional metric, such as the energy consumed by the vapor compression system during its operation.

However, these optimal combinations of control inputs, i.e., sets of control inputs, can be determined in advance, e.g., using a computer-based model reproducing an operation of the vapor compression system, such that any set of the control inputs operates the vapor compression system optimally according to a metric of performance, e.g., energy consumption by the vapor compression system.

Hence, during the operation of the vapor compression system, the task of determining the optimal set of control inputs is reduced to selecting a corresponding set of control inputs from the sets of control inputs determined in advance and stored in a memory. The selecting is based on a difference between the setpoint and a corresponding metric reached by the operation of the vapor compression system. For example, in one embodiment, the setpoint to be reached and maintained as a result of the operation of the vapor compression system is a value of an indoor air temperature, e.g., 22° C. degrees. If the current indoor temperature differs from the setpoint, a new set of the control inputs is selected from the memory.

Because the sets of optimal control inputs are predetermined, the embodiments of the invention selects the particular set of optimal control inputs in real time, while minimizing computation complexity during the operation of the vapor compression system.

The embodiments of the invention are based on another realization that there is a correlation between the setpoint, the amount of heat flow, and values of the control inputs. For example, there is a correlation between the rate of cooling energy delivered by an air-conditioner and the speed of the compressor. For example, one embodiment detects a difference between the values of the current metric and the setpoint, adjusts the value of the compressor speed based on the magnitude and sign of the difference, and selects the set of the control inputs based on that adjusted value, and without an intermediate step of determining the amount of heat flow. Another embodiment, determines additionally a position of the expansion valve to avoid super-heat.

Thus, the embodiments of the invention determine the optimal set of control inputs without determining the amount of heat that the vapor compression system needs to transfer in accordance with a desired setpoint. The embodiments of the invention allow to determine at least one control input based on the operation of the vapor compression system, and to select, based on a value of that one control input, the other remaining control inputs from the memory forming the optimal set of control inputs.

In one embodiment, the sets of control inputs are determined to optimize energy consumption for different amounts of heat flow required to regulate the indoor air temperature for different thermal loads in indoor space. However, other embodiments use different types of setpoints, control inputs and optimization parameters. Typically, the set of control inputs are used to reach and maintain the setpoint during the steady state operation of the vapor compression system. For example, the set of control inputs includes values of the speed of a compressor, the position of an expansion valve, and the speeds of evaporator and condenser fans.

In one embodiment, the sets of control inputs are stored in the memory in a form of a lookup table. Keys to the lookup table can be functions of elements or subset of elements of the set of the control inputs, e.g., a function of the speed of the compressor. Additionally or alternatively, the keys to the lookup table can be values of the setpoint, values of environmental and thermodynamic parameters, and combination thereof. The lookup table can have one or more keys.

In one embodiment the lookup table is constructed using a computer-based model reproducing an operation of the vapor compression system. For example, the model describes the thermodynamics of the refrigerant using established descriptions of the fluid mechanics and heat transfer processes that take place in the vapor compression system. Based on the model, the set of optimal control input is determined and verified for different setpoints. The lookup table can be determined by a user of the system, a designer of the system, or a manufacturer. In one embodiment, values of the lookup table are determined experimentally.

In one embodiment, the selection of the set of control inputs is performed iteratively. Specifically, the setpoint is compared to the current value of a measurement or set of measurements corresponding to the setpoint attained as a result of the operation under the current set of control inputs, e.g., the current indoor air temperature is compared to the indoor air temperature setpoint. If the error between the setpoint and the value of the metric is greater than a threshold, then a new set of control inputs is selected. Such iterations are repeated until a predetermined termination condition is reached, e.g., a desired setpoint, an error is minimized, or a specified number of iterations.

In one embodiment, the sets of control inputs are stored in the memory in a form of an approximator, i.e., a function that represents the mapping between elements or subsets of elements of the control inputs, e.g., the speed of the compressor, and the remaining control inputs. For example, the approximator maps the speed of the compressor to the corresponding speeds of the evaporator and the condenser fans.

Accordingly, embodiments of the invention disclose a method and a system for controlling an operation of a vapor compression system using a set of control inputs. A control value is determined based on an output of the operation of the vapor compression system, e.g., a measurement or set of measurements describing its operation, and a setpoint for the operation of the vapor compression system. This control value is used to select at least a subset of the set of control inputs from a computer-readable medium.

For example, one embodiment discloses a control system for controlling an operation of a vapor compression system using a set of control inputs, such that the operation is optimized according to a metric of performance, the control system comprising: a feedback controller for determining a control value based on an output of the operation of the vapor compression system and a setpoint for the operation of the vapor compression system; a control module for selecting, based on a function of the control value, at least a subset of the set of control inputs from a computer-readable medium, wherein the set of control inputs is determined for the function of the control value to optimize the metric; and a command module for generating a command to operate the vapor compression system based on the set of control inputs, wherein the subset of control inputs, alone or in combination with the function of the control value, forms the set of control inputs.

Another embodiment discloses a method for controlling an operation of a vapor compression system by a set of control inputs, comprising the steps of determining at least one control input based on an output of the operation of the vapor compression system and a setpoint for the operation of the vapor compression system; selecting, based on the control input, a subset of the set of control inputs from a computer-readable medium, such that the control input and the subset of control inputs forms the set of control inputs; and operating the vapor compression system based on the set of control inputs, wherein the steps of the method are performed by the processor.

Yet another embodiment discloses a control system for controlling an operation of a vapor compression system using a set of control inputs, such that the operation is optimized according to a metric of performance, the control system comprising: means for selecting, based on a function of a setpoint for the operation of the vapor compression system, the set of control inputs from a computer-readable medium storing a plurality of sets of control inputs, wherein the set of control inputs is determined for the function of the setpoint to optimize the metric; and means for generating a command to operate the vapor compression system based on the set of control inputs.

DEFINITIONS

In describing embodiments of the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

A "control system" refers to a device or a set of devices to manage, command, direct or regulate the behavior of other devices or systems. The control system can be implemented by either software or hardware, and can include one or several modules. The control system, including feedback loops, can be implemented using a microprocessor. The control system can be an embedded system.

A "computer system" refers to a system having a computer, where the computer comprises computer-readable medium embodying software to operate the computer.

A "network" refers to a number of computers and associated devices that are connected by communication facilities. A network involves permanent connections such as cables, temporary connections such as those made through telephone or other communication links, and/or wireless connections. Examples of a network include an internet, such as the Internet; an intranet; a local area network (LAN); a wide area network (WAN); and a combination of networks, such as an internet and an intranet.

A "vapor compression system" refers to a system that uses the vapor compression cycle to move refrigerant through components of the system based on principles of thermodynamics, fluid mechanics, and/or heat transfer. The vapor compression systems can be, but are not limited to, a heat pump, refrigeration, and an air-conditioner system. The vapor compression systems are used in applications beyond the conditioning of residential or commercial spaces. For example, the vapor compression cycle can be used by the vapor compression system to cool computer chips in high-performance computing applications.

A "HVAC" system refers to any heating, ventilating, and air-conditioning (HVAC) system implementing the vapor compression cycle. HVAC systems span a very broad set of systems, ranging from systems which supply only outdoor air to the occupants of a building, to systems which only control the temperature of a building, to systems which control the temperature and humidity.

"Components of a vapor compression system" refer to any components of the vapor compression system having an operation controllable by the control systems. The components include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor-compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor-compression system.

"Thermodynamic parameters" refer to a set of measurements of physical parameters of the vapor compression system. These parameters include, but are not limited to, temperatures of the air and the refrigerant and pressures of the air and the refrigerant, as well as properties of the refrigerant at various points in the system, such as density, enthalpy, and entropy.

"Set of control inputs" refers to specific values of the inputs for controlling the operation of the components of the vapor compression system. The set of control inputs includes, but are not limited to, values of the speed of the compressor, the position of the expansion valve, the speed of the fan in the evaporator, and the speed of the fan in the condenser.

"Environmental parameters" refer to parameters of the environment effecting or targeted by the operation of the vapor compression system. The environmental parameters include, but are not limited to, indoor and outdoor temperatures, temperature of the air in an inlet and an outlet of both the evaporator and condenser, and the humidity of the air at the evaporator and the condenser.

A "setpoint" refers to a target value the system, such as the vapor compression system, aim to reach and maintain as a result of the operation. The term setpoint is applied to any particular value of a specific set of control inputs and thermodynamic and environmental parameters.

BRIEF DESCRIPTION OF THE DRAWINGS

FIGS. 7A-7F are tables of sets of control inputs; and

DETAILED DESCRIPTION OF THE EMBODIMENTS OF THE INVENTION

Figure 1:
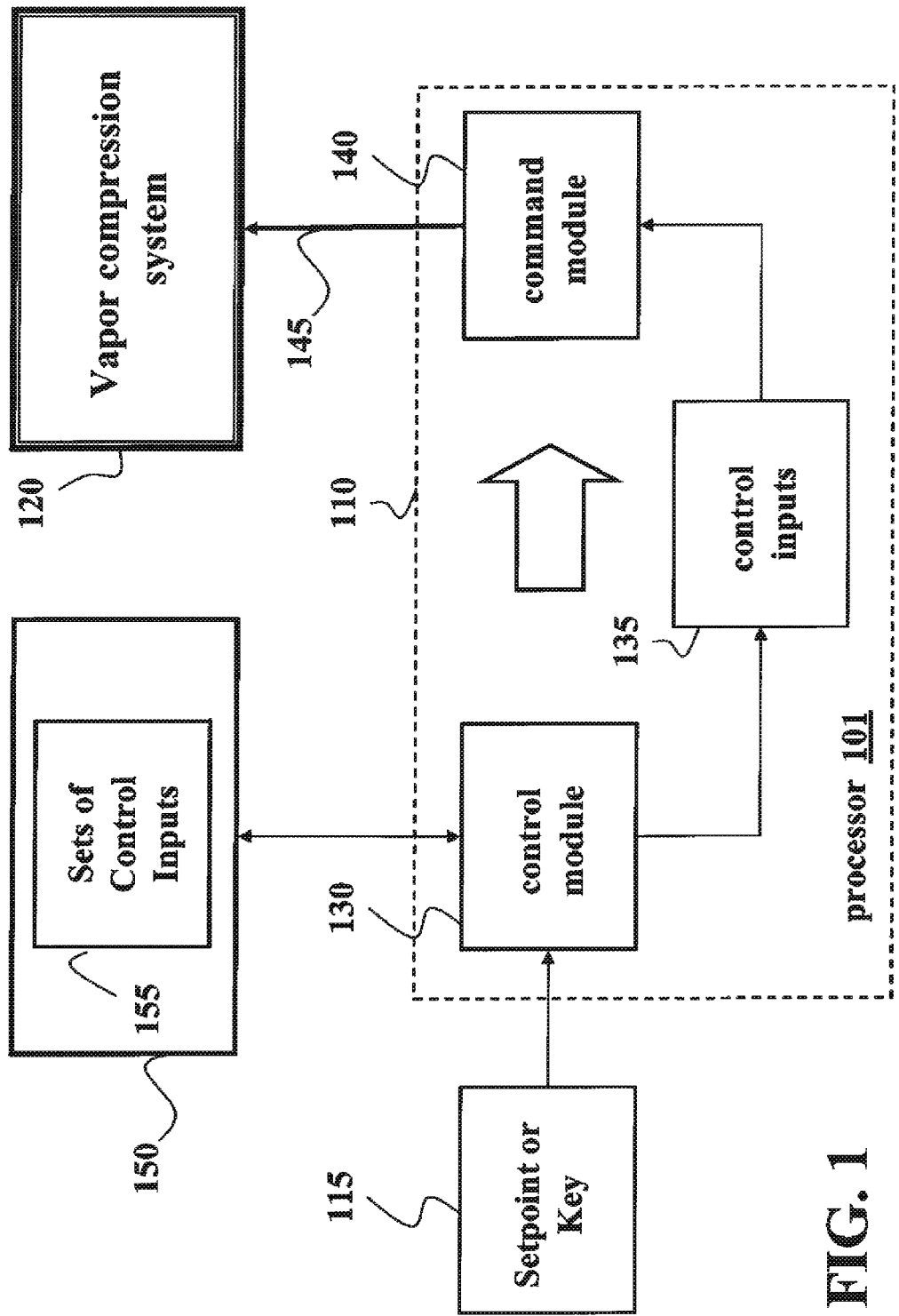
FIGS. 1-2 are block diagrams of a control system for controlling an operation of a vapor compression system according to embodiments of invention.

FIG. 1 shows a control system 110 for controlling an operation of a vapor compression system 120. The control system includes a control module 130 operatively connected to a memory 150 for selecting a set of control inputs 135 from sets of control inputs 155 stored in the memory. In various embodiments, the memory is internal or external to the controller system. The memory can be any computer-readable medium. The control system further includes a command module 140 operatively connected to the control module for generating a command 145 to operate the system 120 based on the set of control inputs. Various embodiments of the control system are implemented using a processor 101.

An example of the vapor compression system is a room air-conditioning system, and heating ventilation air-conditioning (HVAC) system. Each control input controls at least one component of the system. Examples of components are compressor, an expansion valve, an evaporator, and a condenser.

Each set of control inputs corresponds to a particular amount of heat flow and is determined to be the optimal set of control inputs from among the many different sets of control inputs that cause the system to achieve the same amount of the heat flow. For example, a set of control inputs that control the operation of the vapor compression system such that the system consumes the minimal possible amount of energy while achieving a given amount of the heat flow is the optimal set of control inputs from among all possible control input sets that achieve the same amount of the heat flow according to energy efficiency metric. The control module selects the set of control inputs based on a key 115. The key can be any function of a setpoint the system needs to reach as a result of its operation. In some embodiments, the key and corresponding set of control inputs are selected iteratively during the operation of the vapor compression system, until the setpoint is reached.

The embodiments of the invention are based on a realization that there is a correlation between the setpoint, the amount of heat flow, and the control inputs. Moreover, the optimal set of control inputs for different setpoints can be determined in advance.

During the operation of the system 120, the control module selects the set of control inputs predetermined to be optimal for a particular amount of heat flow and associated with a key corresponding to a particular setpoint. Hence, during the operation, the task of determining the set of control inputs is reduced to the selection of an appropriate set of control inputs from the sets of control inputs determined in advance to be optimal and stored in the memory based on the setpoint.

Thus, the embodiments determine the optimal set of control inputs in real time while minimizing computational complexity during the operation of the system. Moreover, because of the predetermined correspondence between the control values used as keys and the sets of control inputs associated with the keys, the set of control inputs is determined based on the setpoint without determining the amount of heat that the vapor compression system needs to transfer in accordance with that setpoint.

For example, in one embodiment, the key is determined based on the setpoint, and a current value of an outdoor temperature. In another embodiment, the key is determined based on the setpoint, a current value of an outdoor temperature, and a current value of an indoor temperature.

Additionally or alternatively, in one embodiment the key is a function of a value of a control input from the set of control inputs. In one variation of this embodiment, the key is the function of the value of a control input responsible for operation of the compressor of the system.

Figure 2:
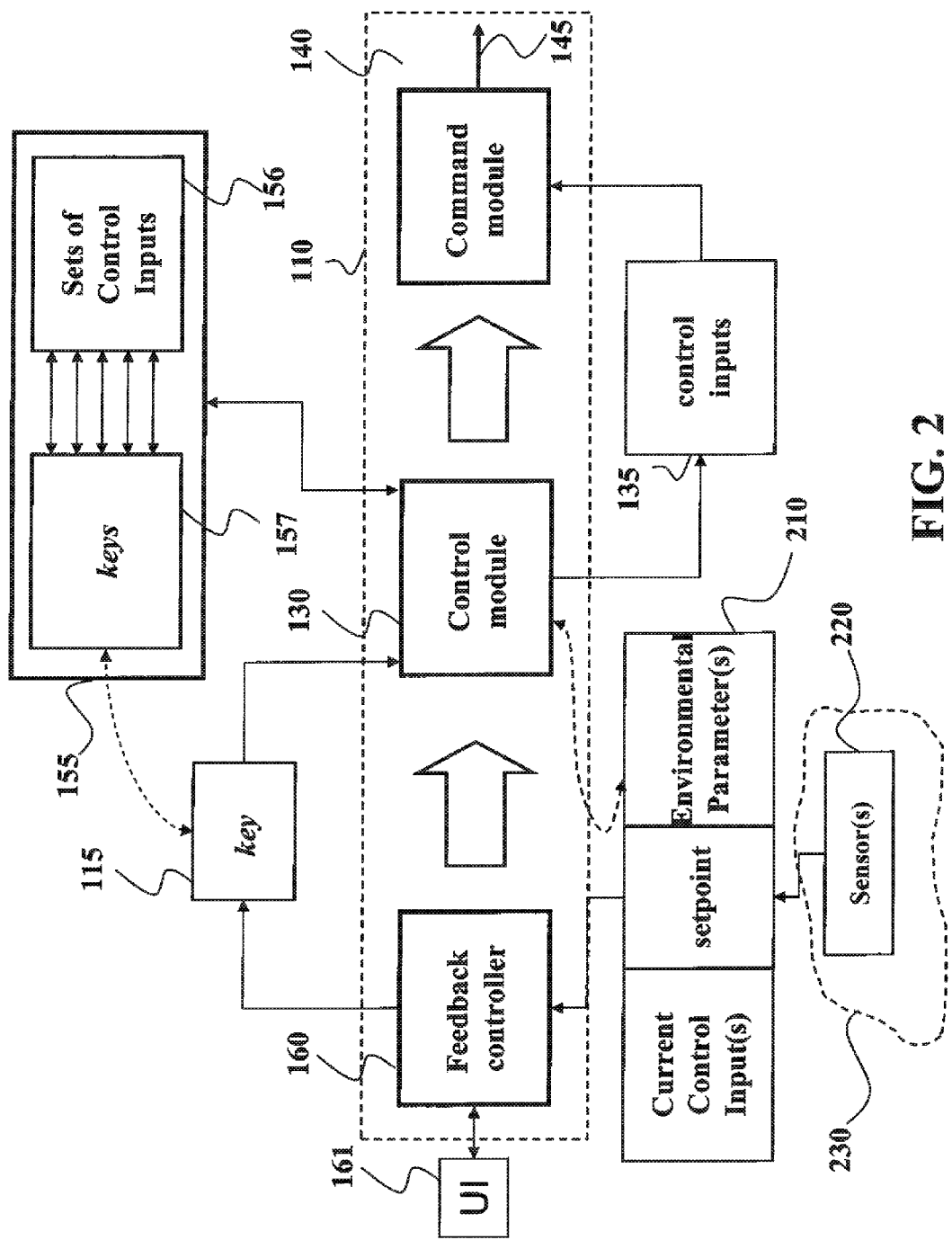

FIG. 2 shows a control system according another embodiment of the invention. This embodiment includes a feedback controller for determining the key 115 that is an input to the control module. Typically, the sets of the control inputs 155 are stored in the memory in a form of a lookup table having the sets of the control inputs 156 associated with corresponding keys 157. In one embodiment, the keys are at least one element of the sets, e.g., a control input responsible for the operation of the compressor of the vapor compression system. Additionally or alternatively, the keys are defined as an arbitrary function of a particular setpoint.

The feedback controller determines the key based on parameters 210, which include, but are not limited to, at least one of the following: the setpoint, one or more current control inputs, and one or more environmental parameters. An example of the setpoint is an indoor temperature specified by a user of the system, an example of the environmental parameters is current indoor and outdoor temperatures, and an example of the current control inputs is the current speed of the compressor, the position of an expansion valve, the speed of the evaporator fan, and the speed of the condenser fan. In various embodiments, the feedback controller is operatively connected to a user input interface 161 for receiving the setpoint, to sensors 220 arranged in environment 230 for sensing current indoor and outdoor temperature, and to the system (not shown) for receiving the current control input parameters. In an alternative embodiment, the feedback controller receives the current input parameters from either control or command modules. Examples of sensors are temperature sensors, such as thermocouple, thermistor, and resistive thermal devices.

Figure 3:
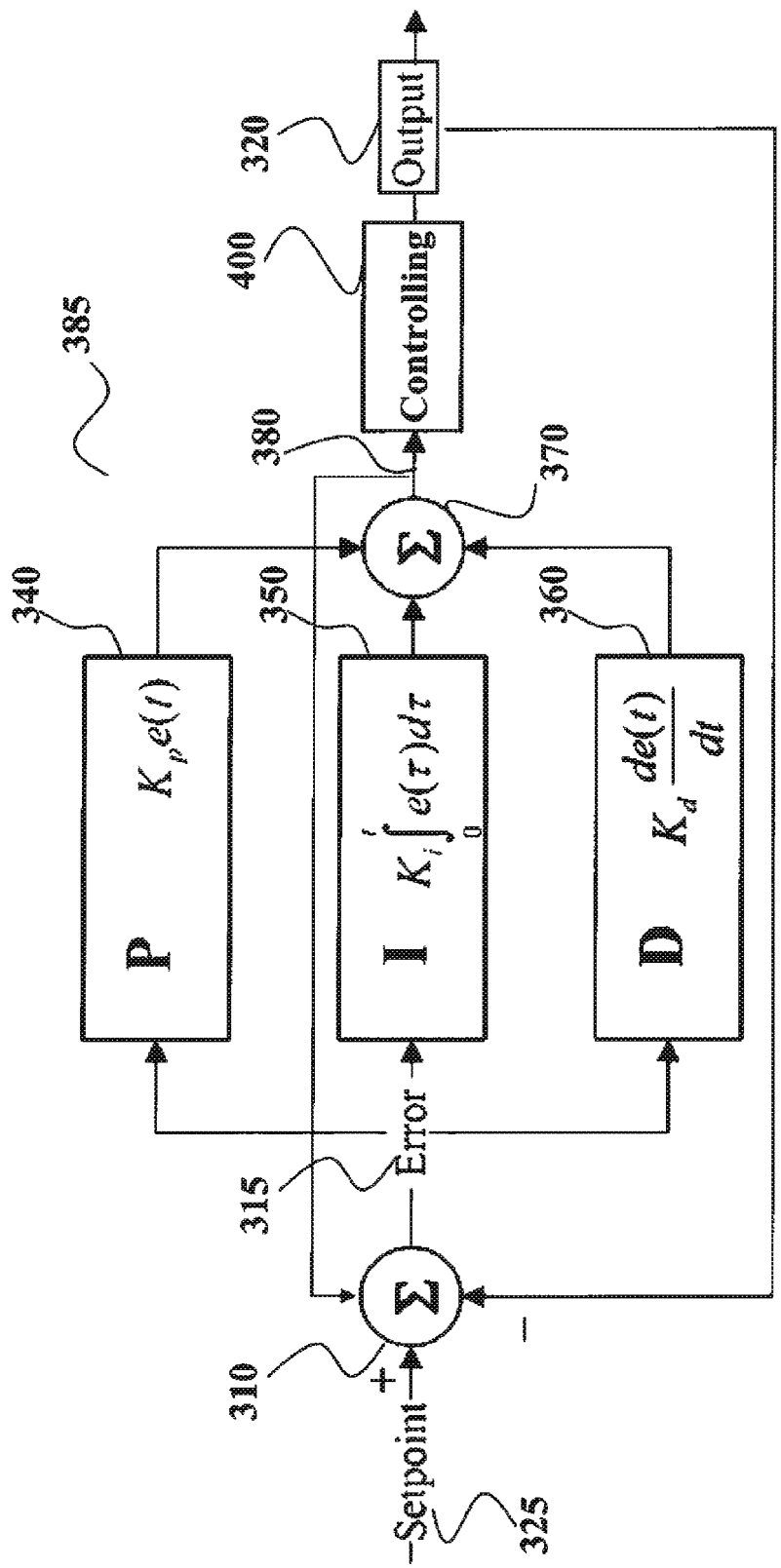
FIG. 3 is a block diagram of a proportional-integral-derivative (PID) controller 300.

In one embodiment, the feedback controller is multiple input multiple output (MIMO) controller. In several other embodiments, the feedback controller is implemented as variations of a proportional integral derivative (PID) controller 300, as shown in FIG. 3. The PID controller calculates 310 an "error" value 315 as the difference between a measured process variable, i.e., output 320 such as the current indoor temperature, and a desired setpoint 325, e.g., a desired indoor temperature. The controller minimizes the error by adjusting at least one of the control inputs.

The PID controller calculation can use three PID controller parameters, i.e., a proportional P 340, an integral I 350 and derivative D 360 parameters. The proportional parameter determines the control input based upon the current error, the integral parameter determines the control input based on the sum of recent errors, and the derivative parameter determines the control input based on the rate at which the error has been changing. The control input 380 is determined 370 as a weighted sum 370 of results of these three determinations and is used to adjust the controlling operations 400. In one embodiment, the control input is the speed or frequency of the compressor, and the current value of the control input is used 385 iteratively by the PID controller to determine the next set of control inputs.

In some embodiments, the PID controller parameters are tuned according to specific parameters of the system and/or operational conditions. For example, one embodiment uses a heuristic method of tuning the PID controller, e.g., a method of Ziegler-Nichols. The tuning is performed by setting the I (integral) and D (derivative) gains to zero. Then, the "P" (proportional) gain is increased from zero until a gain $K_u$ is reached, at which the output of the control loop oscillates with constant amplitude. The gain $K_u$ and the oscillation period $T_u$ are used to set the P, I, and D gains depending on the type of the PID controller used. The response of the PID controller can be described in terms of the responsiveness of the PID controller to an error, the degree to which the controller overshoots the setpoint and the amount of system oscillation.

In some embodiments, only one or two parameters of the PID controller are used in the realization of the controller. This is achieved by setting the gain of undesired control outputs to zero. In those embodiments, the ND controller can be a PI, DI, or I controller in the absence of the respective control actions. For example, because derivative action is sensitive to measurement noise, one embodiment uses the PI controller.

Figure 4:
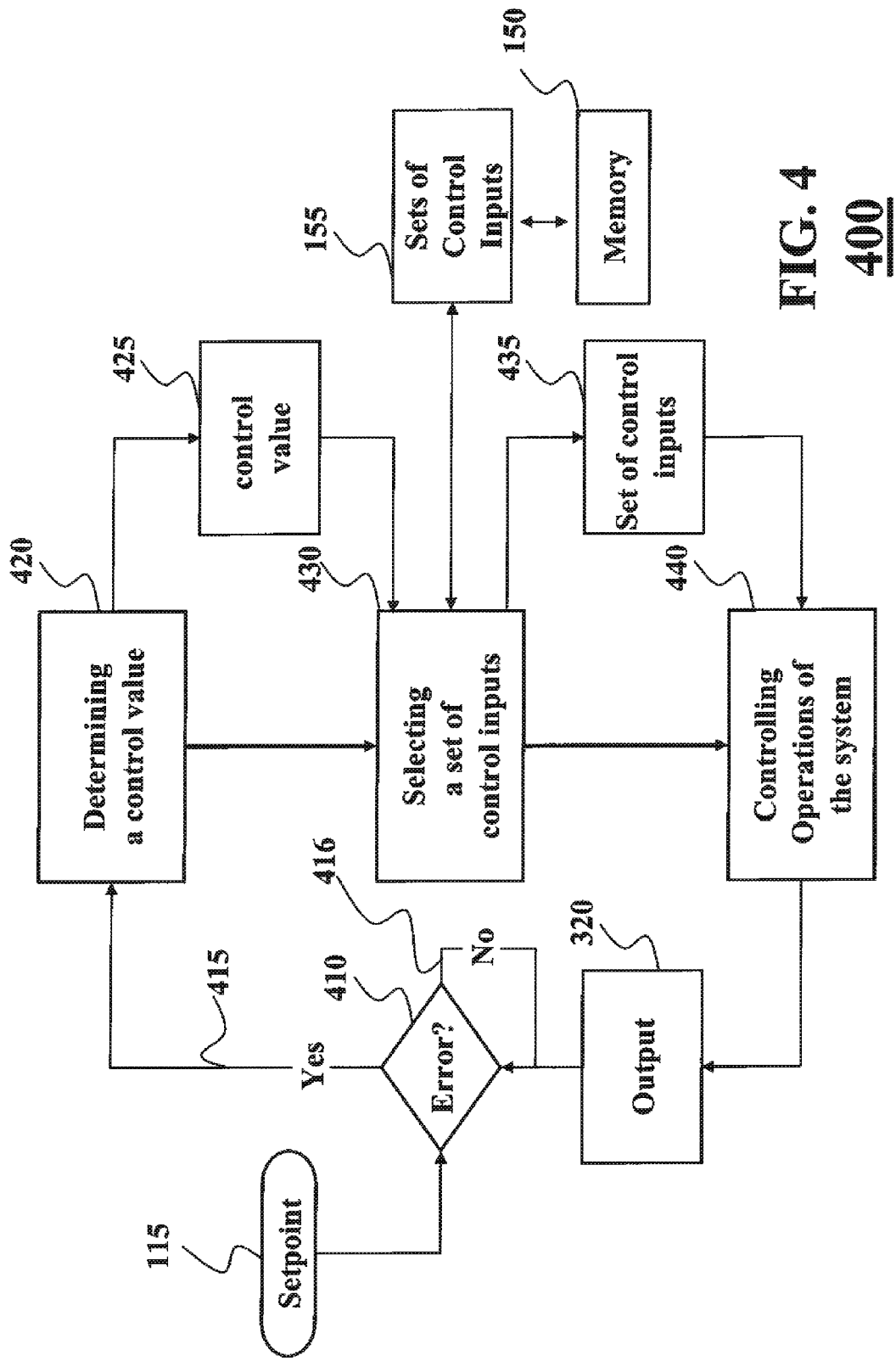
FIG. 4 is a block diagram of a controlling method using the PID controller.

FIG. 4 shows a controlling method 400 using the PID controller. The setpoint 115 is compared 410 with a corresponding measurement of the output 320 of the system 120. If the error is determined 415, then the PID controller determines 420 a control value 425 as described above. In one embodiment, the control value is one of the control inputs.

Using a function of the control value as the key, the set of control inputs is selected 430 from the sets of control inputs 155 stored in the memory 150, and is used to control 440 the operation of the system 120. For example, the function maps the control value to the closest value of the control input used as a key in the lookup table. Additionally or alternatively, the function uses an encryption/decryption or any other transformation of the control value to determine the key. In one embodiment, the function leaves the control value unchanged. The above steps are performed iteratively until a predetermined termination condition is reached, e.g., the error is less than a threshold. In one embodiment, if the error is below a threshold, then the control system does not change the control inputs and resumes the determination of the error in a predetermined period of time and/or when the setpoint is updated.

Figure 5:
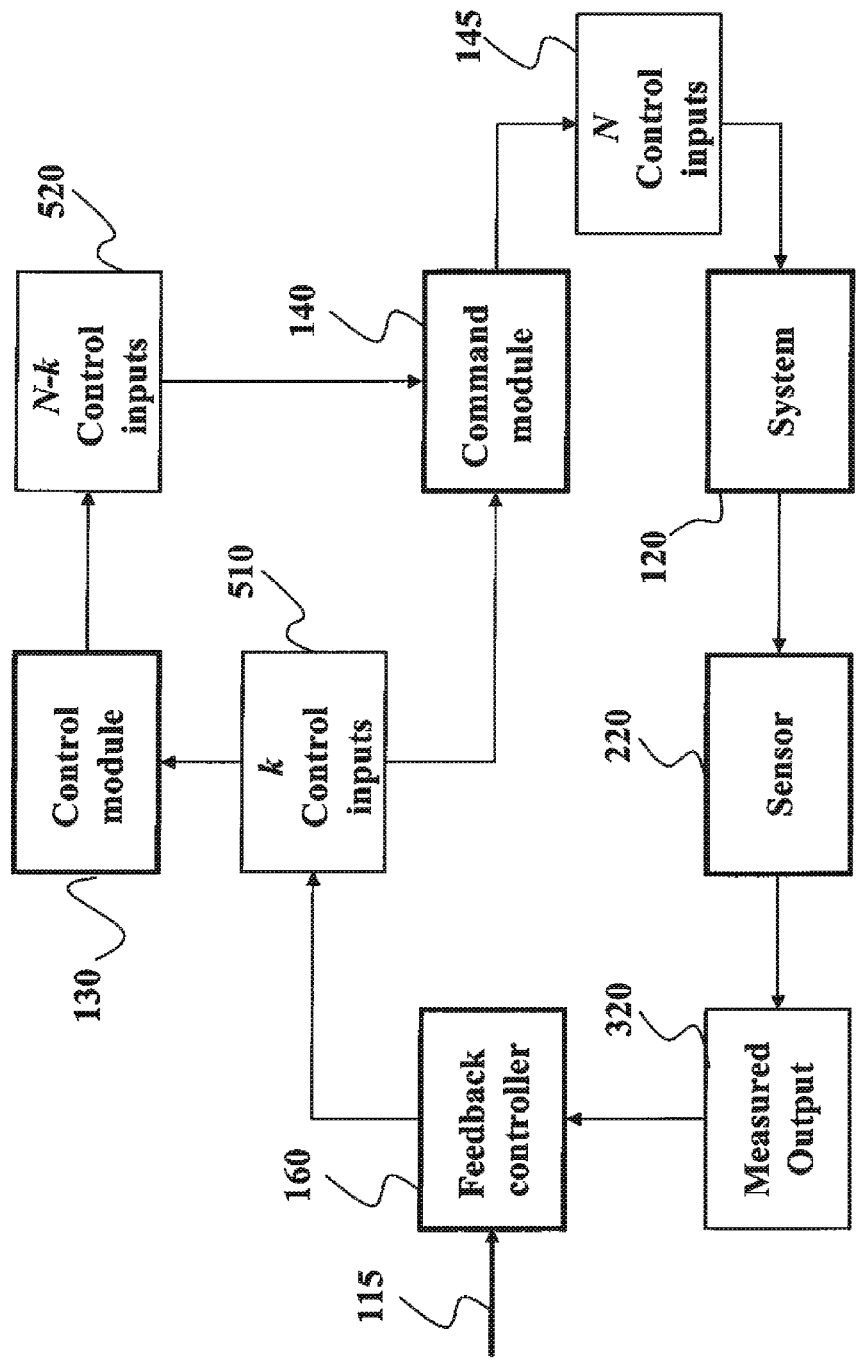
FIG. 5 is a block diagram of one embodiment utilizing the PID controller.

FIG. 5 shows a variation of this embodiment, when the feedback controller determines (k) elements 510 of the set of control inputs having N elements. The values of one or all of the (k) control inputs determined by the feedback controller are used by the control module to select a subset of the remaining (N-k) control inputs 520 from the memory. In this embodiment, the command module combines the (k) control inputs with the subset of (N-k) controls inputs to form the set of control inputs 145.

Figure 6:
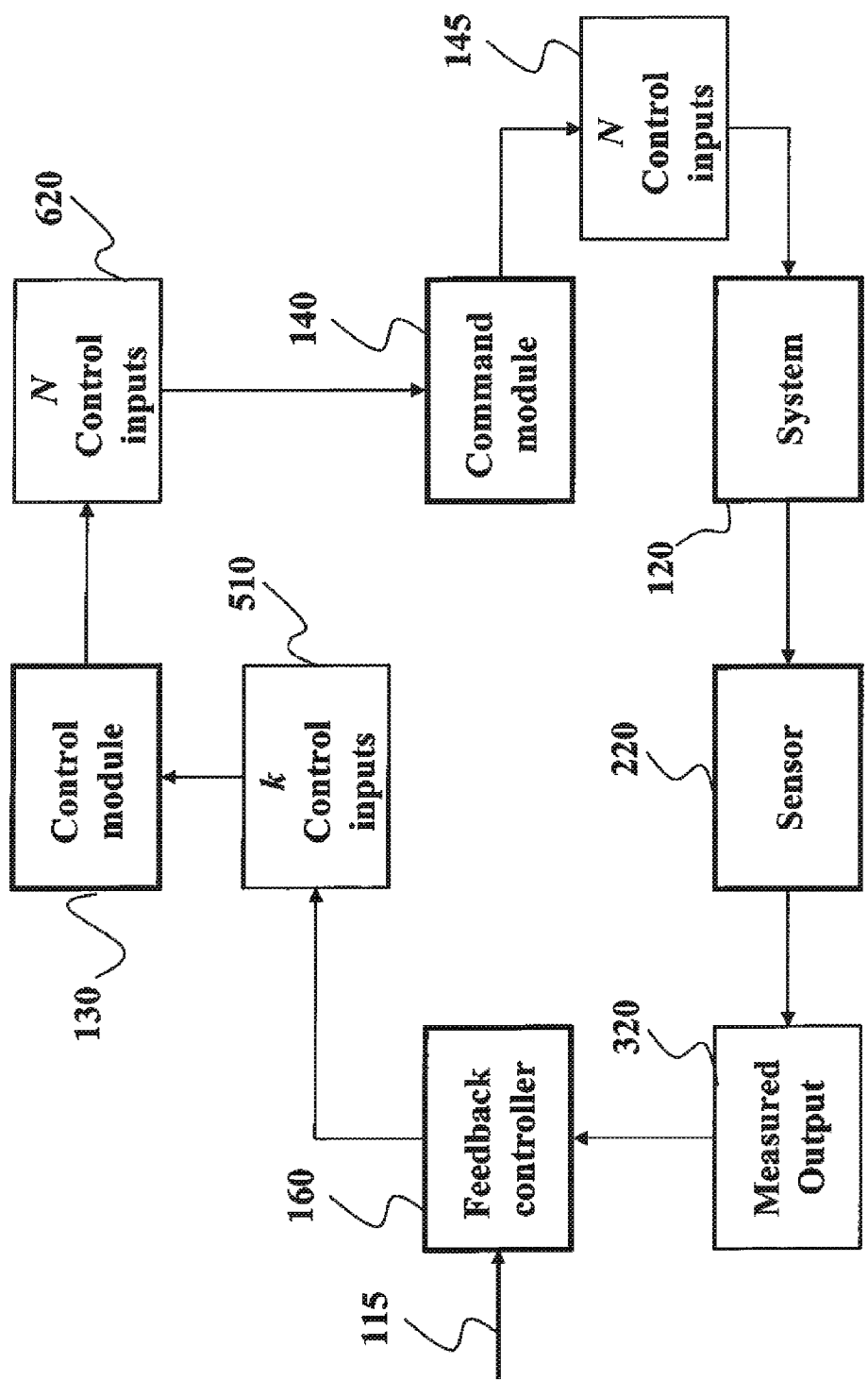
FIG. 6 is a schematic of an embodiment of the control system that uses multiple lookup tables.

FIG. 6 shows an alternative embodiment, wherein the control module selects the set of (N) control inputs 620 based on one or all of the (k) control inputs.

FIGS. 7A-F show examples of the lookup tables 710 and 720 for storing the sets of control inputs, such as the set 715. Each set stored in the lookup table is determined to be optimal according to a metric of performance, e.g., the energy consumption of the vapor compression system. Each element of the sets of control inputs is responsible for the operation of at least one component of the vapor compression system. For example, elements 730 can be responsible for the operation of the compressor, e.g., values of those elements are frequencies of the motor of the compressor. Similarly, elements 740 can be responsible for the operation of the expansion valve, and values of those elements are values of the position of the expansion valve. Also, elements 760 and 770 can be responsible for the operation of the speeds of the evaporator and condenser fans, respectively, and values of those elements are values of revolutions per minute (RPM) of the fans.

Figures 7A, 7B:
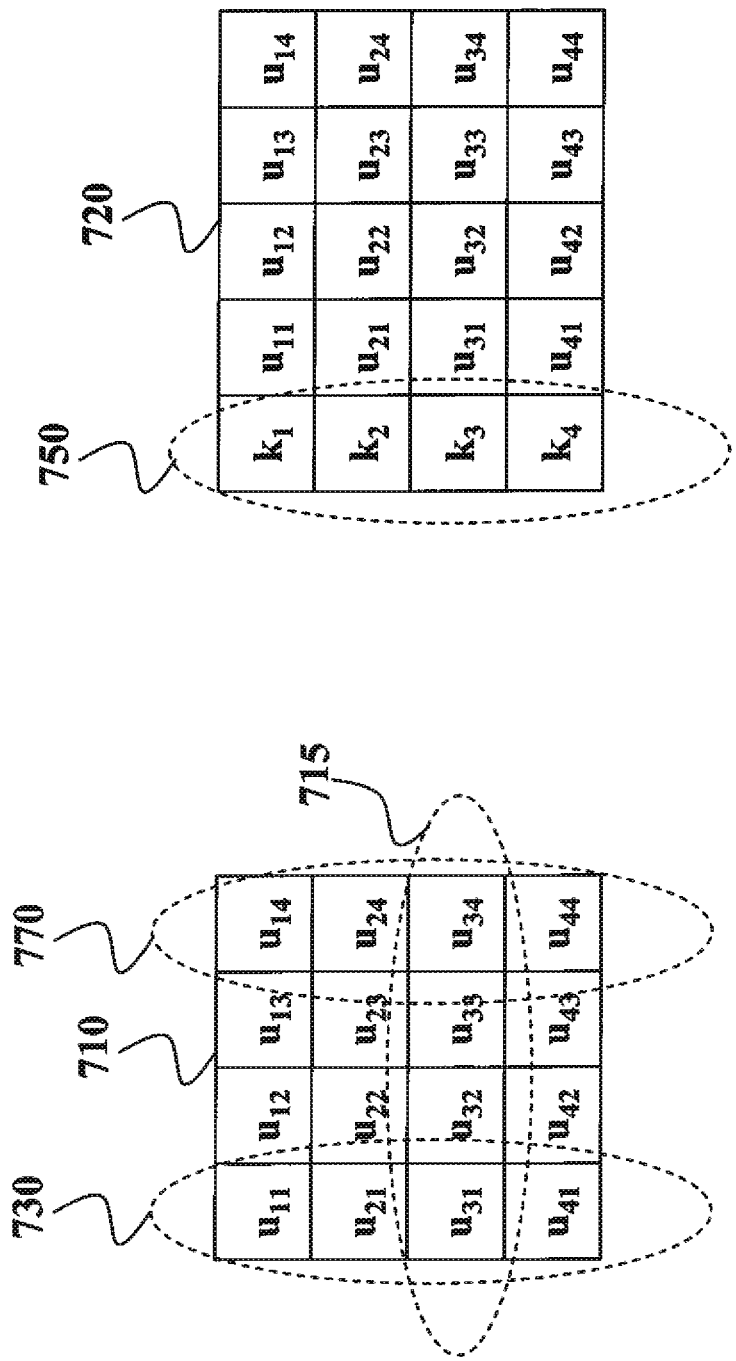
Figure 7C:
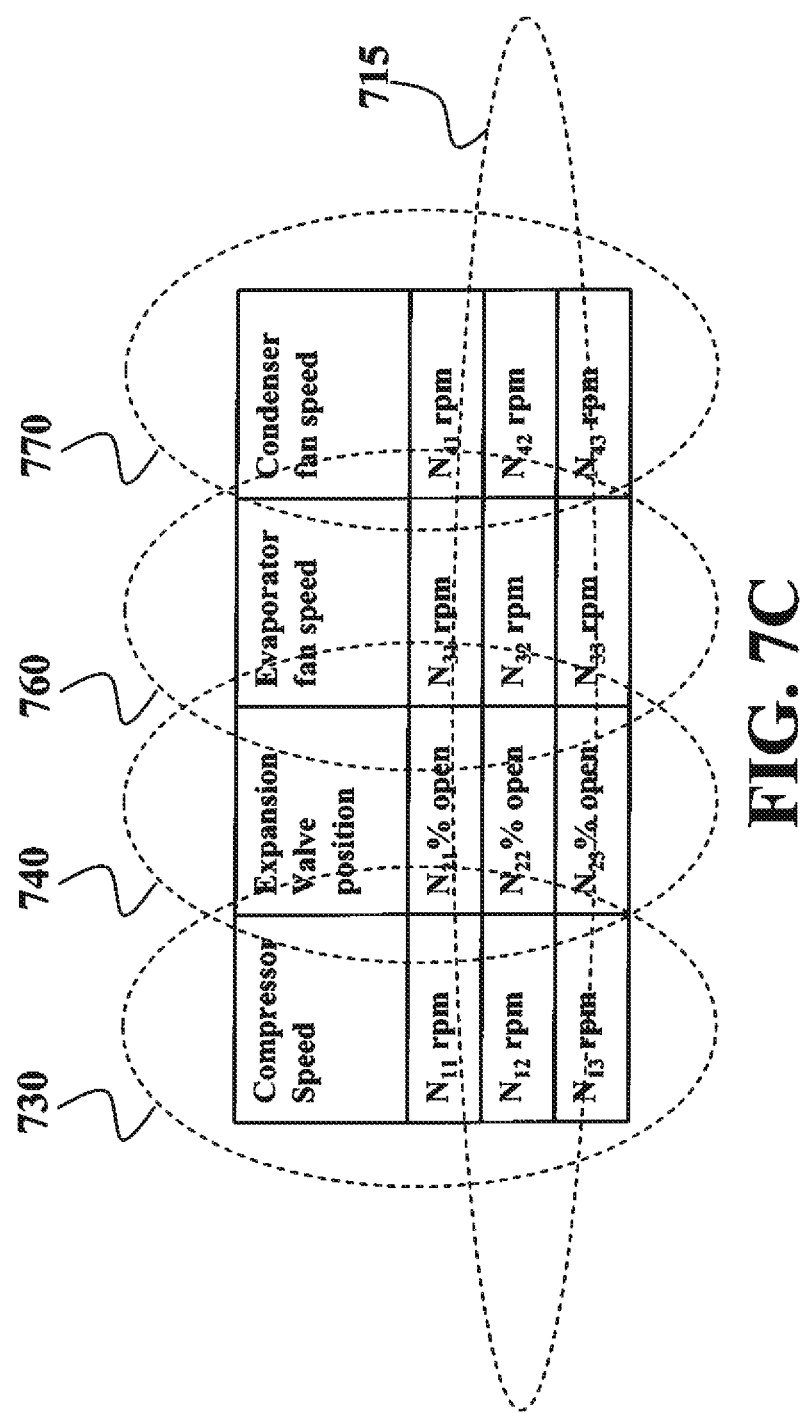

In various embodiments of the invention, the lookup table includes different control inputs and values for the control inputs. FIG. 7C shows an example of the lookup table that includes specific values, illustrated as $N_{sub}$, of control inputs for combinations of the speed of the compressor, the position of the expansion valve, and the speeds for the fans of the evaporator and condenser. FIG. 7D shows an example of the lookup table that includes values as ratios of the full or nominal values, illustrated as $D_{sub}$, of the components of the vapor compression system.

Figure 7E:
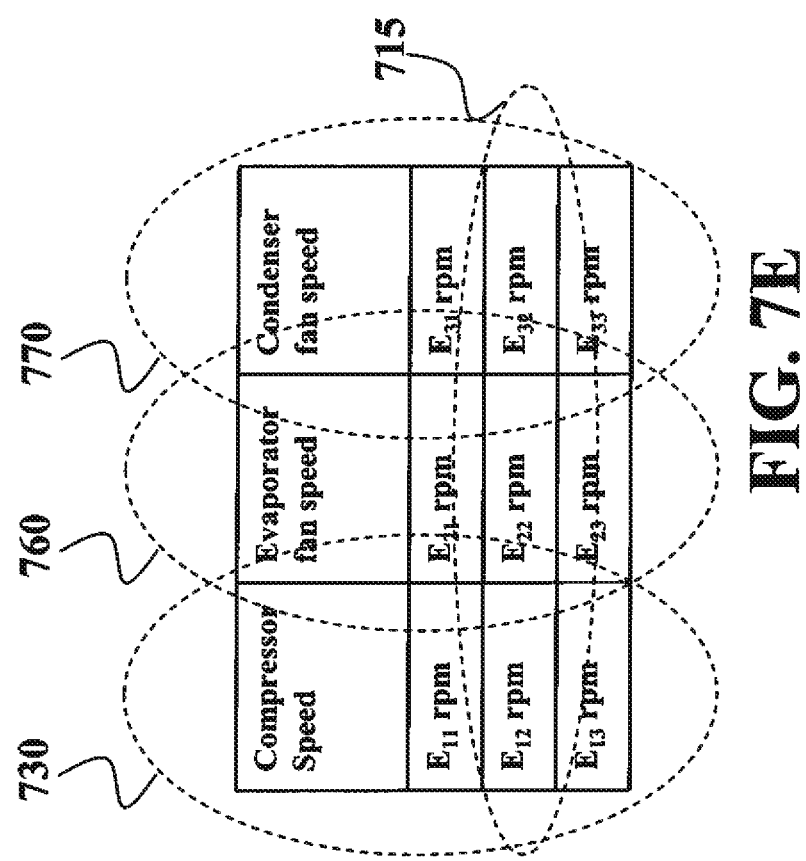

Additionally or alternatively, the lookup table can include values for more or less components of the vapor compression system than lookup tables of FIGS. 7C-D. For example, FIG. 7E shows an example of the lookup table that includes values, illustrated as $E_{sub}$, of control inputs for combinations of the speed of the compressor, and the speeds for the fans of the evaporator and condenser. In one variation of this embodiment, the position of the expansion valve is determined separately, e.g., with help of another feedback loop, or provided in an alternative lookup table.

Figure 7F:
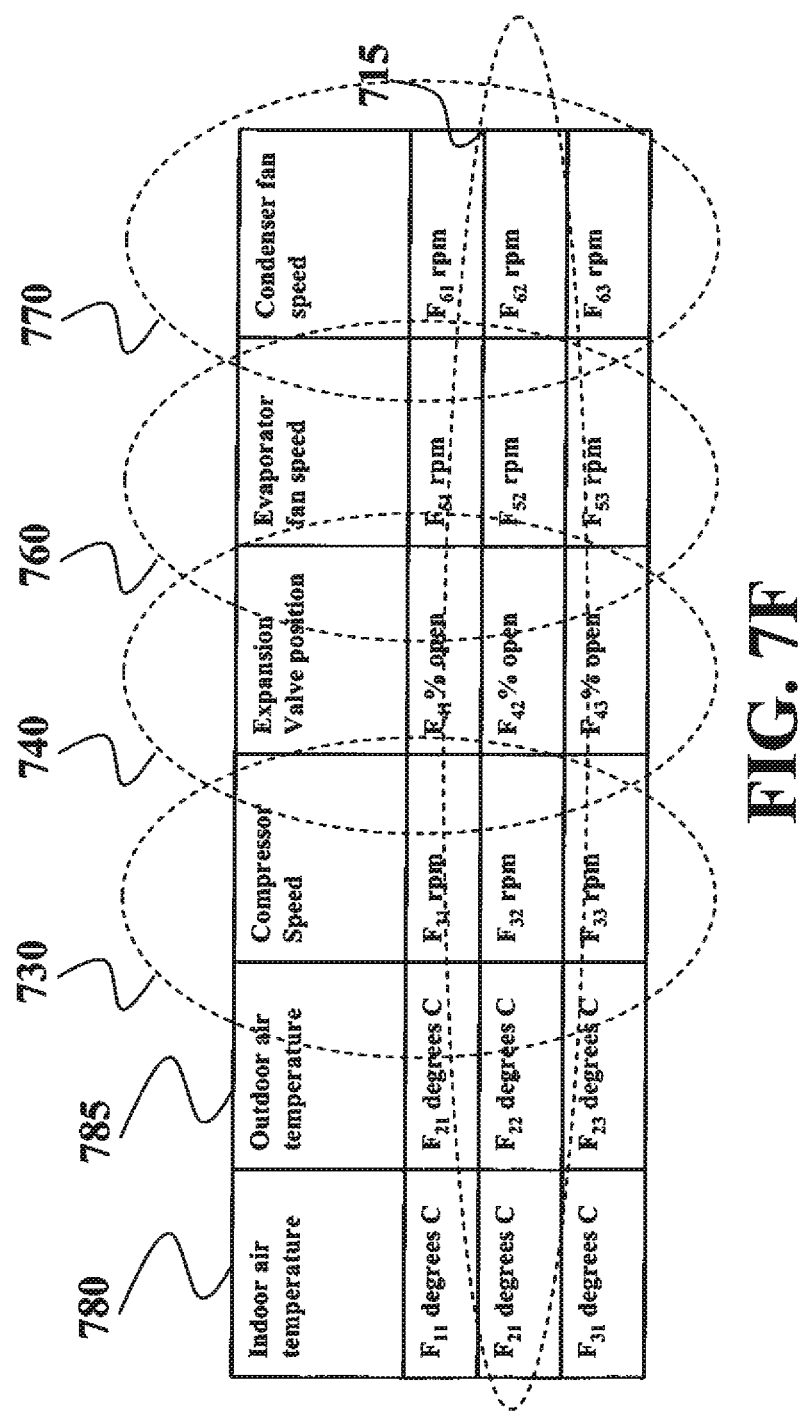

FIG. 7F shows example of the lookup table that includes supplementary information facilitating selection of the combination of the control inputs, illustrated as $F_{sub}$. For example, the lookup table can include different values for indoor air temperature 780 and outdoor air temperature 785. The values of the indoor and the outdoor temperature can be used in the selection of the set of control inputs.

The sets of the control inputs are determined for the function of the control value 425 to optimize the operation of the vapor-compression system according to the metric. For example, the control value is the speed of the compressor, and the set of control inputs is determined to optimize the metric when the speed of the compressor equals the control value. The function of the control value can, e.g., smooth or interpolate the control value according to the data stored in the lookup table, or leave the control value unchanged. Additionally or alternatively, the function can map the control value to the key in the lookup table.

The sets of the control inputs are identified by the keys. In one embodiment, the keys are the functions of the control values 425. In one variation, the functions of the control values are elements of the sets, e.g., elements 730 are the keys. Alternatively, the keys 750 are external to the set, e.g., functions of the setpoints or the amounts heat transfer.

In various embodiments, the lookup table is constructed so that the set of (k) inputs from the feedback controller serves as keys to lookup the values of the other control inputs that result in the energy efficiency of the system. Typically, the information stored in this lookup table is generated ahead of time, e.g., when the system is manufactured, rather than during the operation of the system. Some embodiments use multiple lookup tables. In those embodiments, each lookup table is associated with particular environmental parameters. Based on those parameters, the control module uses a particular lookup table that corresponds to the value of the parameters.

In one embodiment, the lookup table is determined using a computer-based model, which reproduces the dynamics of the operation of the vapor compression system. For example, the model describes the thermodynamics of the refrigerant using established physics-based descriptions of the fluid mechanical and heat transfer processes that take place in the vapor compression system. Based on the model, the set of optimal control input is determined and verified for different setpoints. The lookup table can be determined by a user of the system, a designer of the system, or a manufacturer.

In one embodiment, the sets of control inputs are stored in the memory in a form of an approximator function, i.e., a function that represents the mapping between elements or subsets of elements of the set of the control inputs, e.g., the speed of the compressor, and the remaining control inputs. For example, the approximator function maps the speed of the compressor to the speed of the fan.

Examples of the approximator functions include neural networks, radial-basis function networks, support vector regression models. In this embodiment, the parameters of the approximator function are estimated by means of machine learning algorithms, where the lookup table is constructed as described above, and then the content of the lookup table is treated as training data for the machine learning algorithm. The resulting approximator functions approximate the mapping provided initially by the lookup table.

The control systems described by embodiments of the invention are compatible with different types of vapor compression systems. The command 145 determined by the control system is converted by the vapor compression system to signals suitable to operate its specific motors and other control devices. In various embodiments, the set of control inputs is communicated via the command 145 to the vapor compression system in a sequential, concurrent or other appropriate communication mode.

For example, if the compressor is powered with an inverter controlled by the dynamics of internal switches, the speed of the compressor determined by the control system is converted to a voltage signal, which is interpreted by the inverter to cause the compressor to rotate at the desired speed. The expansion valve can be constructed with a stepper motor, so that a pulse of voltage makes the motor turn a fixed fraction of a rotation. The application of a series of pulses by a microcontroller would result in the control of the valve position. The evaporator and the condenser fans can be controlled using analogous methods.

Example of Controlling HVAC System

Figure 8:
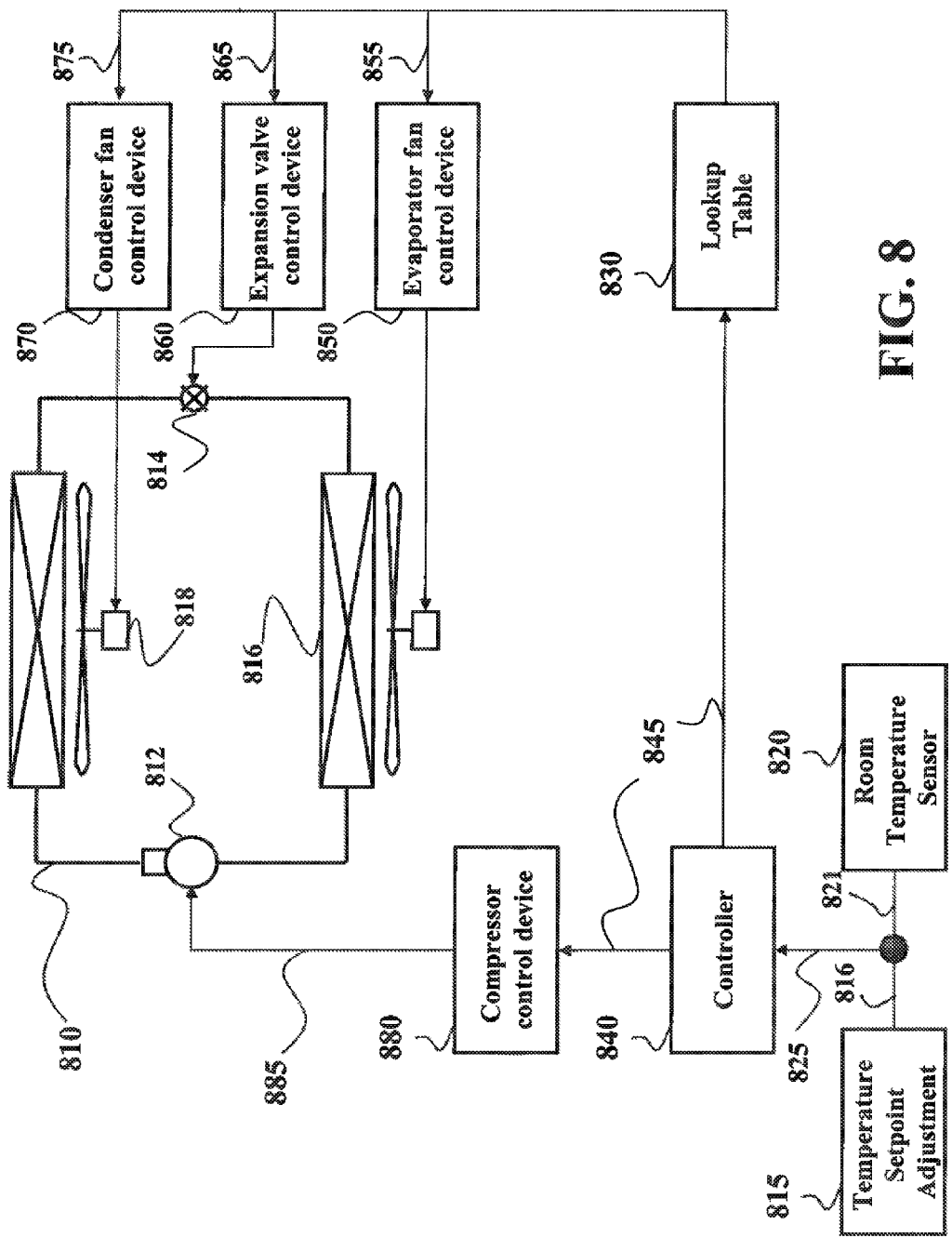
FIG. 8 is an example of controlling heating ventilation air-conditioning (HVAC) system.

FIG. 8 shows an example of controlling HVAC system 810 employing principles of the invention. The HVAC system includes a compressor 812 controlled by a compressor control device 880 an expansion valve 814 controlled by an expansion valve control device 860, an evaporator fan 816 controlled by an evaporator fan control device 850, and a condenser fan 818 controlled by a condenser fan control device 870.

The lookup table 830 stores the sets of control inputs determined to control optimally specific HVAC system, such as HVAC system 810. Each set of control inputs includes values of the speed of the compressor, the position of the expansion valve, the speed of the evaporator fan, and the speed of the condenser fan. Example of lookup table 830 is shown in FIG. 7C. Each set of control inputs is determined for different values of the speed of the compressor. Each set optimizes energy efficiency of the HVAC system having the compressor operated with a particular value of the speed. Accordingly, if the particular value of the speed of the compressor is determined, the control inputs in the set corresponding to that particular value optimize the energy efficiency of the HVAC system.

The controller 840 determines the particular value of the speed of the compressor based on a difference 825 between the setpoint 816 provided by a temperature setpoint adjustment module 815 and a room temperature 821 sensed by a room temperature sensor 820. For example, the controller can use PID controller shown in FIG. 3.

The speed of the controller is communicated to the compressor control device to control the compressor of the HVAC system. Also, the speed is used as a key to the lookup table 830 to select the position 865 of the expansion valve, the speed 855 of the evaporator fan, and the speed 875 of the condenser fan. Typically, the specific values of the control inputs are selected and communicated to the HVAC system with help of control and command modules, not shown in FIG. 8 for clarity.

In alternative embodiment, the controller also determines the position of the expansion valve. The position is determined based on thermodynamic parameters of the HVAC system to avoid super-heat. In this embodiment, the controller is MIMO controller and the lookup table includes speeds of the evaporator and condenser fans for each speed of the compressor.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A vapor compression system for using a vapor compression cycle to move refrigerant through components of the vapor compression system comprising:
- an evaporator having a fan for adjusting an air-flow rate through a heat exchanger, wherein the fan is variable speed fan controlled by an evaporator fan control device;
- a condenser having a fan for adjusting the air-flow rate through the heat exchanger, wherein the fan is variable speed fan controlled by a condenser fan control device,
- a compressor having a speed for compressing and pumping refrigerant through the system, wherein the speed of the compressor is variable and controlled by a compressor control device, and
- an expansion valve for providing an adjustable pressure drop between a high-pressure portion and a low-pressure portion of the vapor compression system, wherein the expansion valve is controlled by an expansion valve control device, the vapor compression system further comprising:
- a control system;
- a user input interface for receiving a setpoint specifying a desired indoor temperature;
- a non-transitory memory for storing a lookup table including sets of control inputs, each set in the sets of control inputs is associated with a key and is predetermined to control a frequency of a motor of the compressor, a position of the expansion valve, a frequency of revolutions of the evaporator fan, and a frequency of revolutions of the condenser fan;
- at least one sensor arranged for sensing an environmental parameter including a current value of an outdoor temperature, and a current value of an indoor temperature; and
- a control device;

wherein, the control system comprises:
- a feedback controller for determining the key using the setpoint, the current value of the outdoor temperature, and the current value of the indoor temperature, if an error between the desired indoor temperature and the current indoor temperature is greater than a threshold, such that the key is determined iteratively until the error is not greater than the threshold;
- a control module for selecting a set of control inputs from the lookup table based on the key, wherein the set of control inputs in the lookup table is predetermined to optimize a performance of the vapor compression system; and
- a command module operatively connected to the control device for generating commands to control the components of the vapor compression system using the set of control inputs.

2. The vapor compression system of claim 1, wherein the feedback controller is a multiple input multiple output (MIMO) or a proportional integral derivative (PID) controller.

3. The vapor compression system of claim 1, wherein the memory stores an approximator function for mapping the key determined by the feedback controller to the set of control inputs, wherein the key is an element of the set of control inputs.

4. The vapor compression system of claim 3, wherein the approximator function is constructed by machine learning algorithms from the sets of control inputs determined to optimize an operation of the vapor compression system.

5. The vapor compression system of claim 1, wherein the at least one sensor includes a temperature sensor.

* * * * *